(12) United States Patent
Seal et al.

(10) Patent No.: US 10,967,339 B2
(45) Date of Patent: Apr. 6, 2021

(54) STATIC MIXER

(71) Applicant: VME Process Inc., Tyler, TX (US)

(72) Inventors: Justin M. Seal, Tyler, TX (US);
Michael Thomas, Tyler, TX (US);
Maurice Michael Laperriere, III,
Tyler, TX (US)

(73) Assignee: VME PROCESS, INC., Tyler, TX (US)

( * ) Notice: Subject to any disclaimer, the term of this patent is extended or adjusted under 35 U.S.C. 154(b) by 171 days.

(21) Appl. No.: 16/095,694

(22) PCT Filed: Jun. 19, 2018

(86) PCT No.: PCT/US2018/038326
§ 371 (c)(1),
(2) Date: Oct. 23, 2018

(87) PCT Pub. No.: WO2019/245538
PCT Pub. Date: Dec. 26, 2019

(65) Prior Publication Data
US 2020/0206700 A1  Jul. 2, 2020

(51) Int. Cl.
*B01F 5/04* (2006.01)
*B01D 17/04* (2006.01)
(Continued)

(52) U.S. Cl.
CPC .......... *B01F 5/0451* (2013.01); *B01D 17/047* (2013.01); *B01F 3/0865* (2013.01); *B01F 5/0405* (2013.01); *B01F 5/0458* (2013.01); *B01F 5/0618* (2013.01); *B01F 5/0653* (2013.01); *C10G 31/08* (2013.01);
(Continued)

(58) Field of Classification Search
CPC .... B01F 5/0451; B01F 3/0865; B01F 5/0405; B01F 5/0458; B01F 5/0618; B01F 5/0653; B01F 2005/0639; B01F 2215/0081; B01F 5/0614; B01F 5/0652; B01D 17/047; C10G 31/08; E21B 43/36; E21B 41/02
See application file for complete search history.

(56) References Cited

U.S. PATENT DOCUMENTS 6,348,657 B1  2/2002  Haslock et al.
6,623,154 B1  9/2003  Garcia
(Continued)

FOREIGN PATENT DOCUMENTS

CN  203002233 U  6/2013
CN  104014263 B  4/2016
GB  2500845 B  6/2015

OTHER PUBLICATIONS

Foreign Communication from a Related Counterpart Application, International Search Report and Written Opinion dated Sep. 18, 2018, International Application No. PCT/US2018/038326 filed on Jun. 19, 2018.

*Primary Examiner* — Randy Boyer
*Assistant Examiner* — Juan C Valencia (57) ABSTRACT

A static mixer for desalting a fluid is disclosed. A static mixer can include a housing, a reduction cone disposed concentrically within the housing; and an expansion cone disposed concentrically within the housing; wherein the static mixer is configured to direct fluid flow through the reduction cone onto the expansion cone, thereby mixing the fluid.

20 Claims, 6 Drawing Sheets

(51) Int. Cl.
  *B01F 3/08* (2006.01)
  *B01F 5/06* (2006.01)
  *C10G 31/08* (2006.01)
  *E21B 43/36* (2006.01)

(52) U.S. Cl.
  CPC ...... *E21B 43/36* (2013.01); *B01F 2005/0639* (2013.01); *B01F 2215/0081* (2013.01)

(56) References Cited

U.S. PATENT DOCUMENTS

| | | | |
|---|---|---|---|
| 7,878,705 B2* | 2/2011 | Schauerte | B01F 5/0688 366/337 |
| 8,409,334 B2 | 4/2013 | Audunson et al. | |
| 9,067,183 B2 | 6/2015 | Glanville | |
| 9,416,604 B2 | 8/2016 | Cobb | |
| 10,471,640 B2* | 11/2019 | Heusser | B29C 48/32 |
| 2004/0251566 A1 | 12/2004 | Kozyuk | |
| 2010/0276340 A1 | 11/2010 | Norling | |
| 2014/0301157 A1* | 10/2014 | Glanville | B01F 5/0652 366/337 |
| 2015/0071028 A1* | 3/2015 | Glanville | B01F 5/0605 366/337 |
| 2017/0291151 A1* | 10/2017 | Berglund | B01F 15/063 |

\* cited by examiner

FIG. 6 ial Application No. PCT/US2018/038326, filed Jun. 19, 2018, entitled "STATIC MIXER," which is incorporated herein by reference in its entirety for all purposes.

BACKGROUND

In some geographical areas, fluid produced from a well may yield crude oil having substantial quantities of water and undesired substances, such as salt. In some instances, the salt and water content may be so high as to interfere with subsequent transportation, storage, and refining of the crude. Salt and water in the crude may be highly deleterious to some metal equipment and piping, and therefore it may be desirable that at least some of the water and undesired substances be separated and removed from the crude.

SUMMARY

In an embodiment, a static mixer for desalting a fluid is disclosed. A static mixer can include a housing; a reduction cone disposed concentrically within the housing; and an expansion cone disposed concentrically within the housing adjacent to the reduction cone; wherein the static mixer is configured to direct fluid flow through the reduction cone onto the expansion cone, thereby mixing the fluid.

A static mixer for desalting a fluid is disclosed, according to another embodiment. A static mixer can include a housing; a reduction cone disposed concentrically within the housing; an expansion cone disposed concentrically within the housing adjacent to the reduction cone; and a plurality of blades disposed within the housing; wherein the static mixer is configured to increase a velocity of a fluid with the reduction cone, distribute the fluid with the expansion cone, and rotate the fluid with the plurality of blades, thereby mixing the fluid.

A static mixer for desalting a fluid is disclosed, according to another embodiment. A static mixer can include a housing; an expansion cone disposed concentrically within the housing; and a plurality of blades disposed within the housing; wherein the static mixer is configured to direct fluid flow onto the expansion cone and through the plurality of blades, thereby mixing the fluid.

A method for static mixing to desalt a fluid is disclosed, according to another embodiment. The method can comprise allowing the fluid to flow through a reduction cone; increasing a velocity of the fluid with the reduction cone; directing the fluid onto an expansion cone; maintaining an increased velocity with the expansion cone; and distributing the fluid over the expansion cone, thereby mixing the fluid.

A method for static mixing to desalt a fluid is disclosed, according to another embodiment. The method can include allowing the fluid to flow through a reduction cone; increasing a velocity of the fluid with the reduction cone; directing the fluid onto an expansion cone; maintaining an increased velocity with the expansion cone; distributing the fluid over the expansion cone, thereby mixing the fluid; allowing the fluid to flow through a plurality of blades, wherein each blade is inclined with respect to a longitudinal axis passing through a center of the reduction cone and expansion cone; and rotating the fluid with the plurality of blades, thereby mixing the fluid.

A method for static mixing to desalt a fluid is disclosed, according to another embodiment. The method can include directing the fluid onto an expansion cone; distributing the fluid over the expansion cone; allowing the fluid to flow through a plurality of blades, wherein each blade is inclined with respect to a longitudinal axis passing through a center of the reduction cone and expansion cone; and rotating the fluid with the plurality of blades, thereby mixing the fluid.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to a static mixer for contacting two immiscible liquids such as fresh water with an oil/water mixture to provide for desalting of the oil phase. Typically, when oil is produced from a well, it may contain oil, water, and salt, where the salt may be present not only in the water, but also in the oil. In order to remove the salt from the produced fluid that includes oil, water, and salt, a desalter may be used to first separate the water and then contact the oil with fresh water to extract any salt into the water. Part of the desalting process may involve a specific mixing in a mixer prior to further separation of the water that has removed the salt from the oil.

A number of mixer designs exist, all of which have drawbacks. As noted above, a function of the mixer may be to provide contact between the oil and the introduced fresh water. There may be a balance in the amount of mixing that is to be achieved. On one hand, increased mixing may help to provide better transfer of the salts into the water based on an increased contact area between the two liquid phases, while on the other hand, increased mixing may make it difficult to separate the two phases downstream of the mixer. The static mixer proposed herein may strike a balance that may provide improved contact and salt removal without creating a two phase mixture that is difficult to separate (e.g., such as an emulsion). Additionally, the static mixer proposed herein may allow for close contact between fluids to produce a large interfacial area to improve mass transfer (e.g., salt) from the oil to the water.

As described herein, the mixer comprises a static mixer such that the mixer has no moving parts. The mixer can have several sections that aid in creating the mixing including a reduction cone, an expansion cone, and rotational section comprising a plurality of blades. The reduction cone can serve to increase a fluid velocity. An expansion cone can then be placed downstream of the reduction cone. The expansion cone can be configured to direct the fluid flow outwards while maintaining an increased velocity. While the overall flow cross-sectional area past the reduction cone and the expansion cone can be similar, the expansion cone can serve to change the direction of the fluid flow, and thereby create a mixing of the two-phase fluid. In order to further improve mixing, a rotation inducing section comprising a plurality of blades can be used downstream of the expansion cone. The expansion cone can then direct the fluid into the blades which can cause the fluid to rotate, thereby further increasing mixing and contact between the two phases. While the combination of all three sections may provide the desired mixing, only one or two of the sections may be needed in any particular application. Further, the use of the various sections serves to provide the desired contact between a multi-phase liquid solution while avoiding the creation of an emulsion that is difficult to separate. Thus, the present mixer design serves to provide mixing between a multi-phase fluid in a compact design while having no moving parts.

Figure 1:
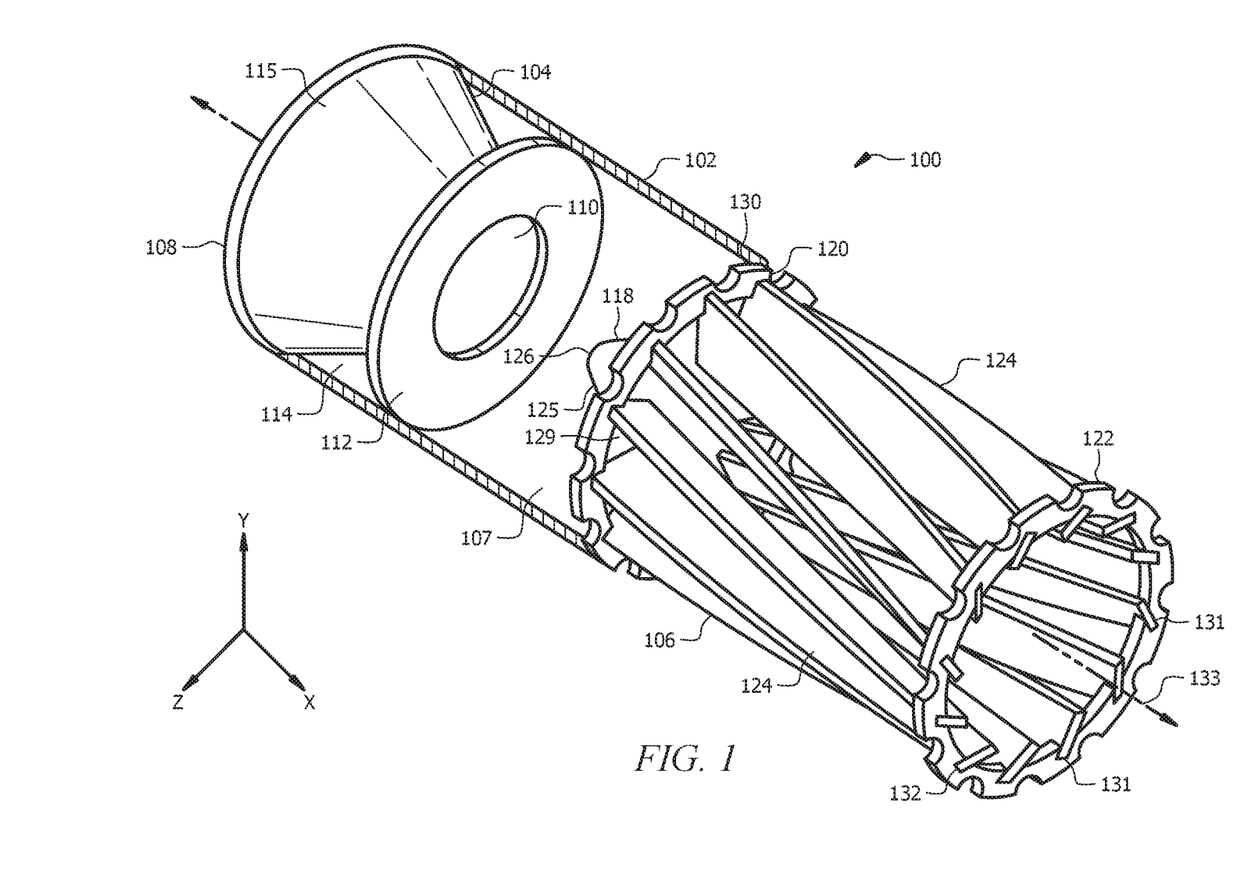
FIG. 1 illustrates a static mixer in accordance with embodiments of the disclosure.

FIG. 1 illustrates a static mixer 100. Static mixer 100 may include tubular housing 102, a reduction cone 104, an expansion cone assembly 106, and a mixing chamber 107. The static mixer 100 may not include moving components. In some embodiments, the static mixer 100 may be utilized as an insert, and may be positioned into an existing pipe or pipes (pipe string), such as, for example, on a production platform, within a pipeline, or in a subsea assembly, or the like. In certain embodiments, the static mixer 100 may be positioned in a separate pipe (shown on FIG. 4), and then the separate pipe may be integrated into a pipe string. It should be noted that dimensions and/or spacing of each component of static mixer 100 can affect the functionality of the static mixer 100, as described in more detail herein.

The housing 102 may include an internal bore 103 (shown on FIG. 5) with a diameter that may be less than an internal diameter of a pipe (e.g., pipe 134 shown on FIG. 4) that the static mixer 100 may be positioned concentrically. The housing 102 may include a length from about 2 to about 8 diameters of the pipe, though the exact length can vary. The housing 102 may include any suitable material, such as, for example, metal.

The reduction cone 104 may be disposed concentrically within housing 102. In general, the reduction cone 104 may be formed as a frusto-conical cone section configured to direct fluid passing through the interior of the housing through a reduced flow area, thus increasing the flow velocity. The reduction cone 104 may be retained within housing 102 (e.g., against the internal bore 103) using any suitable connections such as welding, etc. The reduction cone 104 can include a flow-in opening 108, a flow-out opening 110, and optionally a flashing or grommet 112. An internal diameter of reduction cone 104 may decrease from the flow-in opening 108 to the flow-out opening 110, thereby increasing a velocity of a fluid passing through it. That is, the reduction cone 104 can be configured to increase a velocity of a fluid passing through it. A height of the reduction cone 104 may be between about one quarter to about three quarters, or about one half of the diameter of the internal bore 103. The height may be measured from the flow-in opening 108 to the flow-out opening 110 (i.e., a length in the axial direction).

The flow-in opening 108 may have a diameter that is less than the diameter of the internal bore 103 to account for the connection of the reduction cone 104 within the housing 102, though the diameter may be approximately that of the internal bore of the housing 102. The flow-out opening 110 may include a diameter that may be between about one quarter to about three quarters, or about one half of the diameter of internal bore 103. That is, flow-in opening 108 may include a larger diameter than flow-out opening 110. In some embodiments, the flow-out opening 110 can have a diameter of between about 5 inches and about 9 inches, though the diameter can vary depending on the selection of the size of the housing 102.

The optional grommet 112 may be positioned at a circumference of the flow-out opening 110. When used, the grommet 112 may be positioned to prevent fluid from flowing back into volume 114, which is a position in the upstream direction of the flow-out opening 110. The grommet 112 can contact or be connected to both the internal bore 103 and the reduction cone 104 at or near the flow-out opening 110 to provide a seal. In some embodiments, the grommet 112 may only connect to one of the reduction cone 104 or the internal bore 103, but not necessarily both as the grommet 112 serves to prevent backflow around the reduction cone 104 and a perfect seal may not necessarily be required. The volume 114 defined between the exterior 115 of the reduction cone 104, the internal bore 103 of the housing 102 and the upstream surface of the grommet 112 may exist within housing 102 due to a tapering of the reduction cone 104 from the flow-in opening 108 to flow-out opening 110. The volume 114 can contain air in some instances, though the volume 114 can also contain the fluid passing through the mixer 100, where the grommet 112 serves to substantially prevent any backflow such that any fluid in the volume 114 may be stagnant during use.

The expansion cone assembly 106 may be positioned downstream from the reduction cone 104 within the housing 102. With additional reference to FIG. 2 and FIG. 3, the expansion cone assembly 106 may include an expansion cone 118. The expansion cone assembly 106 can serve to redirect flow of the fluid from a central region within the housing 102 towards and outside of the flow path. In general, the reduction cone 104 serves to accelerate the fluid by directing the fluid through a flow area having a reduced cross section. The reduced cross sectional area also serves to direct the flow of fluid through the housing 102 into a central portion of the flow path. The expansion cone assembly 106 can then serve to redirect this flow outwards without slowing the fluid. At least a portion of the mixing occurring within the mixer 100 can occur based on the combination of the flow through the reduction cone 104 and the expansion cone assembly 106. The expansion cone assembly 106 may be formed from any suitable material, such as, for example, metal.

Figure 2:
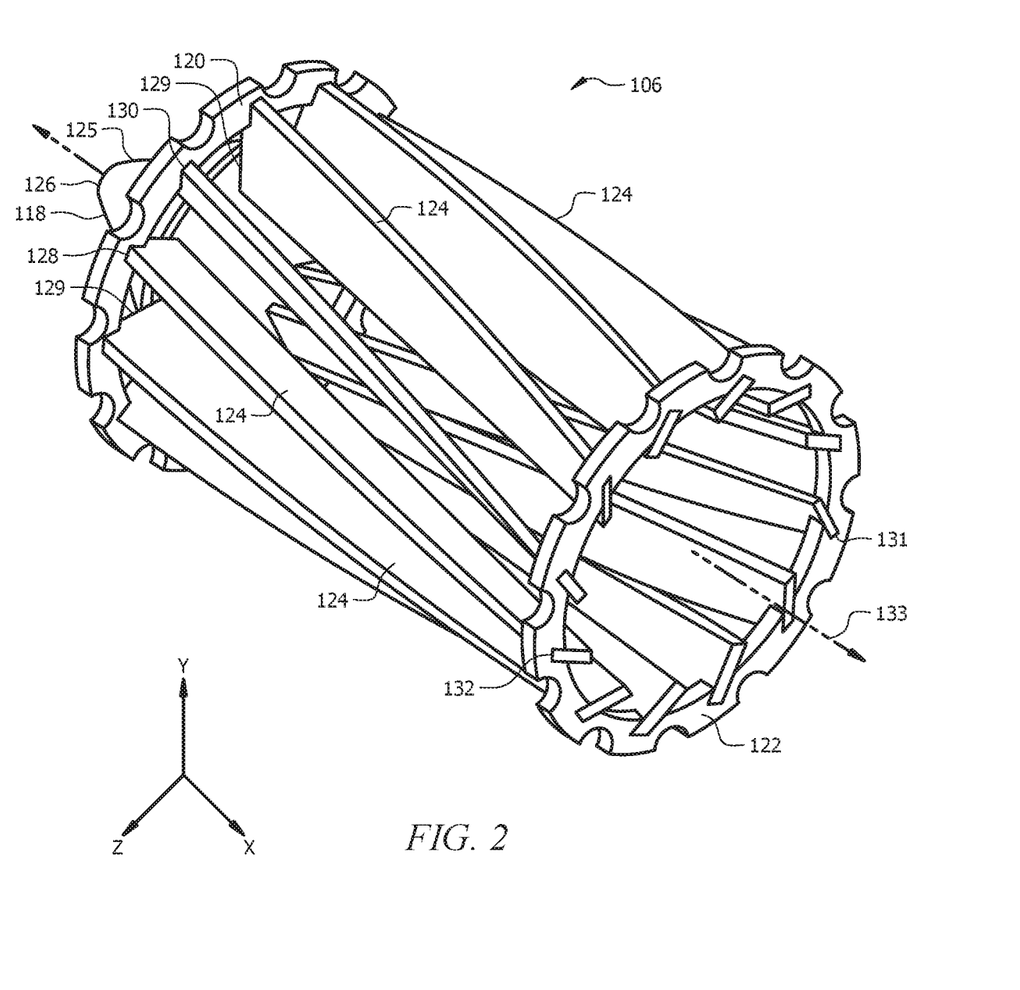
FIG. 2 illustrates an expansion cone assembly in accordance with embodiments of the disclosure.
Figure 3:
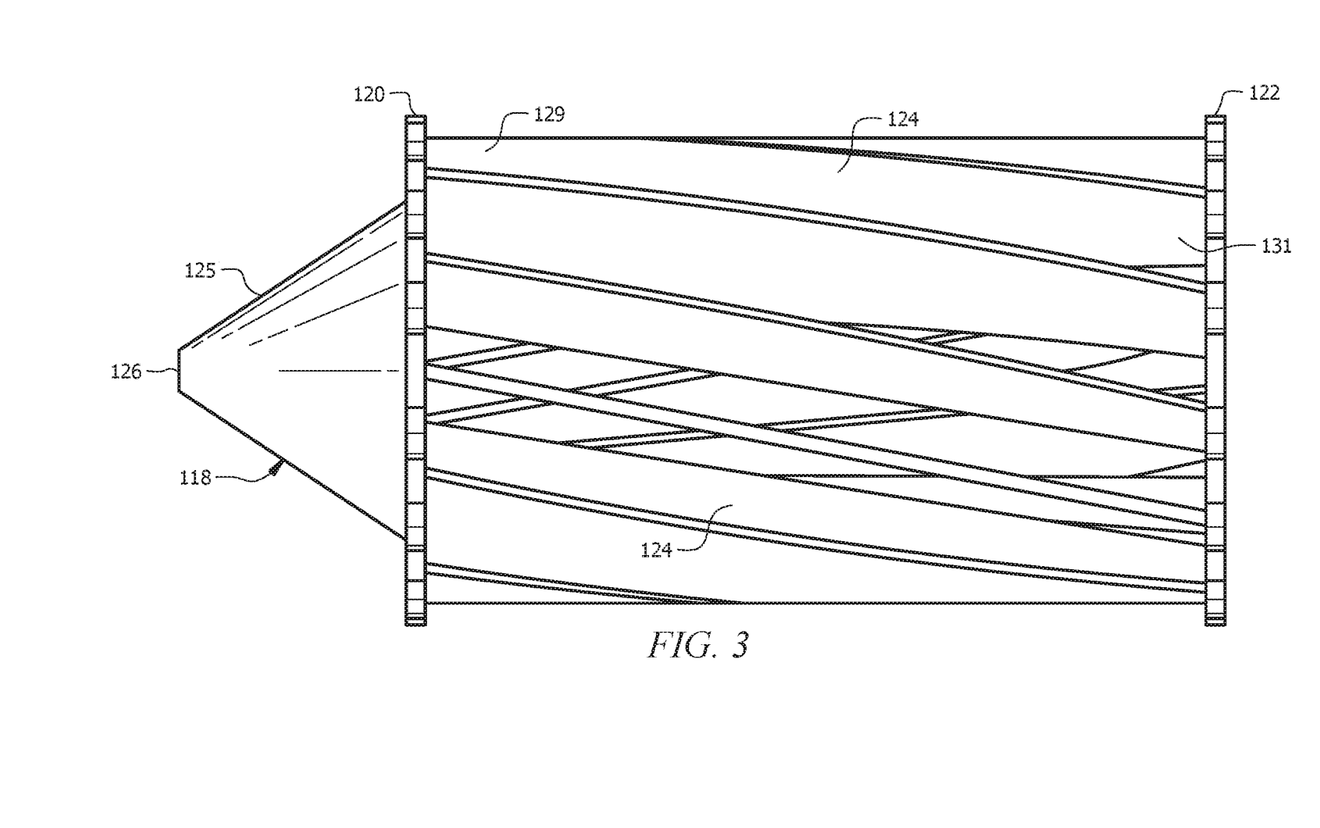
FIG. 3 illustrates a side view of an expansion cone assembly in accordance with embodiments of the disclosure.

The expansion cone 118 may be positioned concentrically within the housing 102 and may include an exterior surface 125, a lead end or apex 126, and a base 128. In general, the expansion cone 118 can be hollow. The apex 126 of the expansion cone 118 can have a point or be a flat section with a diameter of between about 5% to about 25% of the internal diameter of the housing 102, or about 10% to about 20% of the internal diameter of the housing 102. In some embodiments in which the apex 126 of the expansion cone 118 has a flat section, the diameter of the flat section can be between about 0.5 inches to about 2 inches. The apex 126 may not contain an opening, and as a result, fluid may not flow through it. However, fluid may contact the apex 126 and be redirected to flow along an exterior surface 125 toward the base 128. That is, the static mixer 100 may be configured to direct fluid flow through reduction cone 104 and onto and around the apex 126 and the exterior surface 125. The conical profile of the expansion cone 118 may maintain an increased velocity of a fluid that contacts it relative to the fluid upstream of the reduction cone 104. That is, the reduction cone 104 may increase a velocity of a fluid and expansion cone may maintain this increased velocity of the fluid and distribute the fluid over exterior surface 125, thereby mixing the two phase fluid. The apex 126 may align with a center of the flow-out opening 110 and may face the flow-out opening 110. A height of the expansion cone 118 may be between about one quarter to three quarters of the diameter of the internal bore 103, or between about one half of the diameter of internal bore 103. The height of the cone 118 may be measured from the apex 126 to the base 128.

The base 128 can be maintained in position within the housing 102 using any suitable configurations. In some embodiments, the base 128 can be coupled (e.g., via welds) to the proximal ends 129 of the blades 124. That is, the blades 124 may be positioned downstream from the base 128. In order to allow fluid flow around the base 128, the base 128 may not directly contact the housing 102, but may be retained in position within the center of the housing 102. A diameter of the base 128 may be between about one quarter to three quarters of the internal diameter of the housing 102, or about one half of the diameter of internal bore 103.

The blades 124 may extend from the first ring 120 to a second ring 122 about the longitudinal axis 133 of the housing 102. The second ring 122 may be positioned downstream from the first ring 120. The blades 124 may be straight flat blades of a rectangular shape, and may include any suitable material, such as, for example, metal (e.g., sheet metal). The blades 124 may have a length that may be between about 1 to about 2 times (e.g., 1.5) the diameter of internal bore 103. In some embodiments, the blades 124 are not curved of bent within the mixer 100.

The first ring 120 and the second ring 122 may each be positioned concentrically within the housing 102 at axially spaced positions and attached to the internal bore 103 by any suitable means, such as, for example, welds. A distance between the first ring 120 and the second ring 122 may be about 1 to about 2 times (e.g., about 1.5) the diameter of the internal bore 103. The first ring 120 and the second ring 122 may be positioned to allow fluid to flow through a central portion of the first ring 120 and a central portion of the second ring 122. One or more openings or recesses may be disposed in an outer diameter of the first ring 120 and/or the second ring 122. The openings may allow for fluid flow between the outer portion of the first ring 120 and/or the second ring 122 and an interior surface of the housing 102 during use as well as to allow fluid to drain out of mixer after use. The fluid flow between the first ring 120 and/or the second ring 122 and the interior surface of the housing 102 may provide additional fluid flow through the rings during use of the mixer 100.

The first ring 120 may include slots 130 (first ring slots), and the second ring 122 may include slots 132 (second ring slots). The blades 124 may be disposed between the first ring 120 and the second ring 122 due to the proximal ends 129 of the blades 124 being positioned into the slots 130 and the distal ends 131 of the blades 124 being positioned into the slots 132. The blades 124 may be welded into the slots 130 and 132. The blades 124 may extend longitudinally along longitudinal axis 133 and also may extend from the slots 130 laterally towards the centers of first ring 120. This positioning of the blades 124 may allow for contact between a fluid and the blades 124, as the multiphase fluid flows along the exterior surface 125 of the expansion cone 118 and through and along the blades 124 to allow efficient contact and mixing of the fluid.

The first ring 120 and the second ring 122 may include an outer diameter that may be about the diameter of the internal bore 103. The first ring slots 130 and the second ring slots 132 may be offset from each other (e.g., offset angle of about 25° to about 45° relative to longitudinal axis 133 of housing 102), thereby causing the blades 124 to be inclined relative to the longitudinal axis. For example, the blades may collectively include a twist/bend about the longitudinal axis while the individual blades are not individually bent or twisted, as the blades 124 extend longitudinally from the first ring 120 to the second ring 122. The twist/bend about the longitudinal axis may allow for an efficient mixing of the fluid (e.g., the fluid may flow along the blades 124 defining the twist/bend about the longitudinal axis). That is, the blades 124 may be configured to rotate the fluid passing through them, thereby mixing the fluid. A distance between the apex 126 and the flow-out opening 110 may be between about one quarter and three quarters or about one half of the diameter of internal bore 103 (e.g., 6 inches). A distance from apex 126 to second ring 122 may be between about 1.5 to 2.5 times, or about twice the diameter of internal bore 103 (e.g., 24 inches).

The slots 130 in the first ring 120 can be aligned radially such that the blades 124 are arranged with a radial alignment at the first ring 120. In other words, the flat sides of the blades 124 can be aligned with planes passing radially outwards from the center of the housing 102 at the first ring 120. The second ring 122 can contain a corresponding number of slots 132 to hold the second end of the blades 124 extending from the first ring 120. While the blades 124 can be radially aligned at the first ring 120, the longitudinal alignment of the blades 124 may be angled with respect to the longitudinal axis of the housing 102 such that the blades 124 are not longitudinally parallel with the longitudinal axis of the housing 102. Rather, by having straight blades disposed at a non-parallel angle with respect to the longitudinal axis of the housing 102, the blades 124 are not radially aligned at the second ring 122. Rather, the blades 124 can be non-radially aligned, or aligned at an angle with respect to the center of the housing 102 at the second ring 122. The resulting flow path between the first ring 120 and the second ring 122 between the blades 124 can induce a spin or circulation in the fluid flowing through the blades 124. In this embodiment, the blades 124 are straight but form the collective twist about the longitudinal axis.

As shown in FIGS. 2 and 3, the alignment of the blades 124 in the mixing section can result in an open section defined by an interior surface of each of the blades 124. The open section can have a frusto-conical shape starting at a first end of the blades adjacent the expansion cone 118 having a diameter approximately equal to the internal diameter of the housing 102 minus the radial length of two of the blades on either side of the ring and any radial distance contributed by the ring. At the second ring 122, the open section can have an expanded diameter due to the non-radial alignment of the blades at the second ring 122 (where the interior diameter of the housing and any spacing of the ring are approximately the same at the second ring 122). Thus, the radial distance of the extent of the blades 124 can decrease from the first ring 120 to the second ring 122.

A mixing chamber 107 may include a volume within housing 102 from the flow-out opening 110 to the second ring 122. The mixing chamber 107 may allow for mixing of the multi-phase fluid due to the reduction cone 104 and the expansion cone assembly 106. A combination of the reduction cone 104 and the expansion cone 118 of the expansion cone assembly 106 may provide an initial mixing and contact between the two phases, and then the blades 124 of the expansion cone assembly 106 may provide a subsequent mixing and contact between the two phases, due to rotation of the fluid, as noted above.

Figure 4:
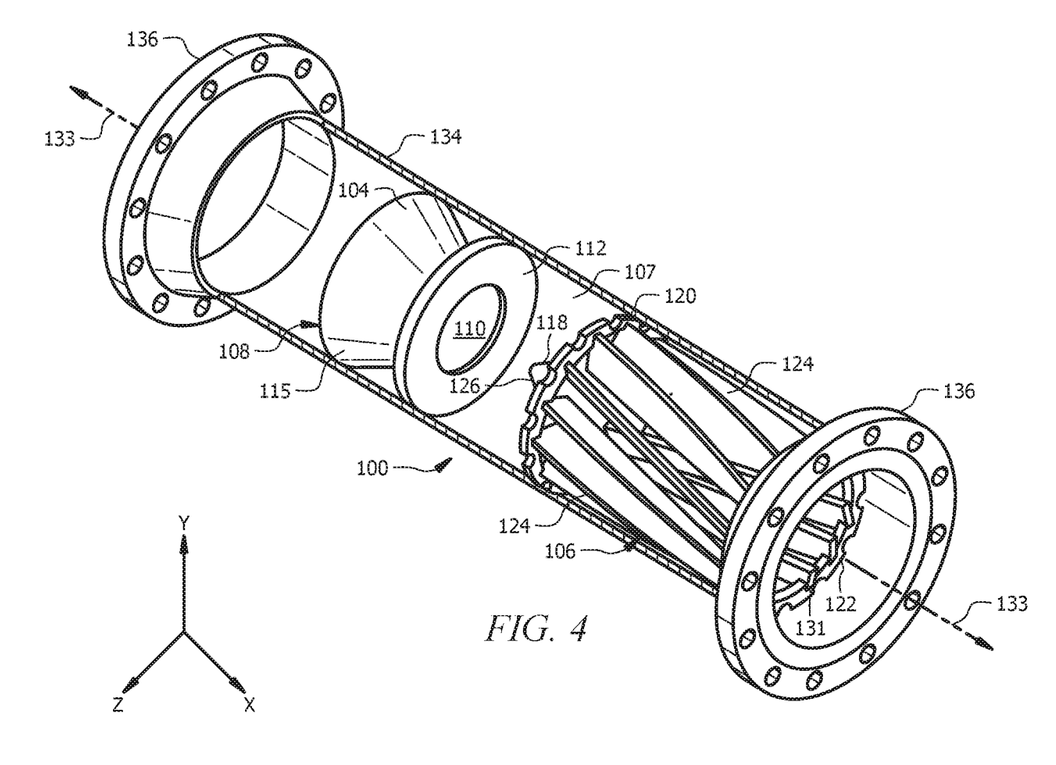
FIG. 4 illustrates a static mixer disposed within a pipe in accordance with embodiments of the disclosure.

FIG. 4 illustrates the static mixer 100 disposed within a pipe 134. The flanges 136 may be included on each end of the pipe 134, where the pipe 134 can be integrated into an existing pipe string and connected to the pipe string via the flanges 136. As noted above, the static mixer 100 may be utilized as an insert (shown on FIG. 1) or fabricated within separate pipe 134, as depicted in FIG. 4.

Figure 5:
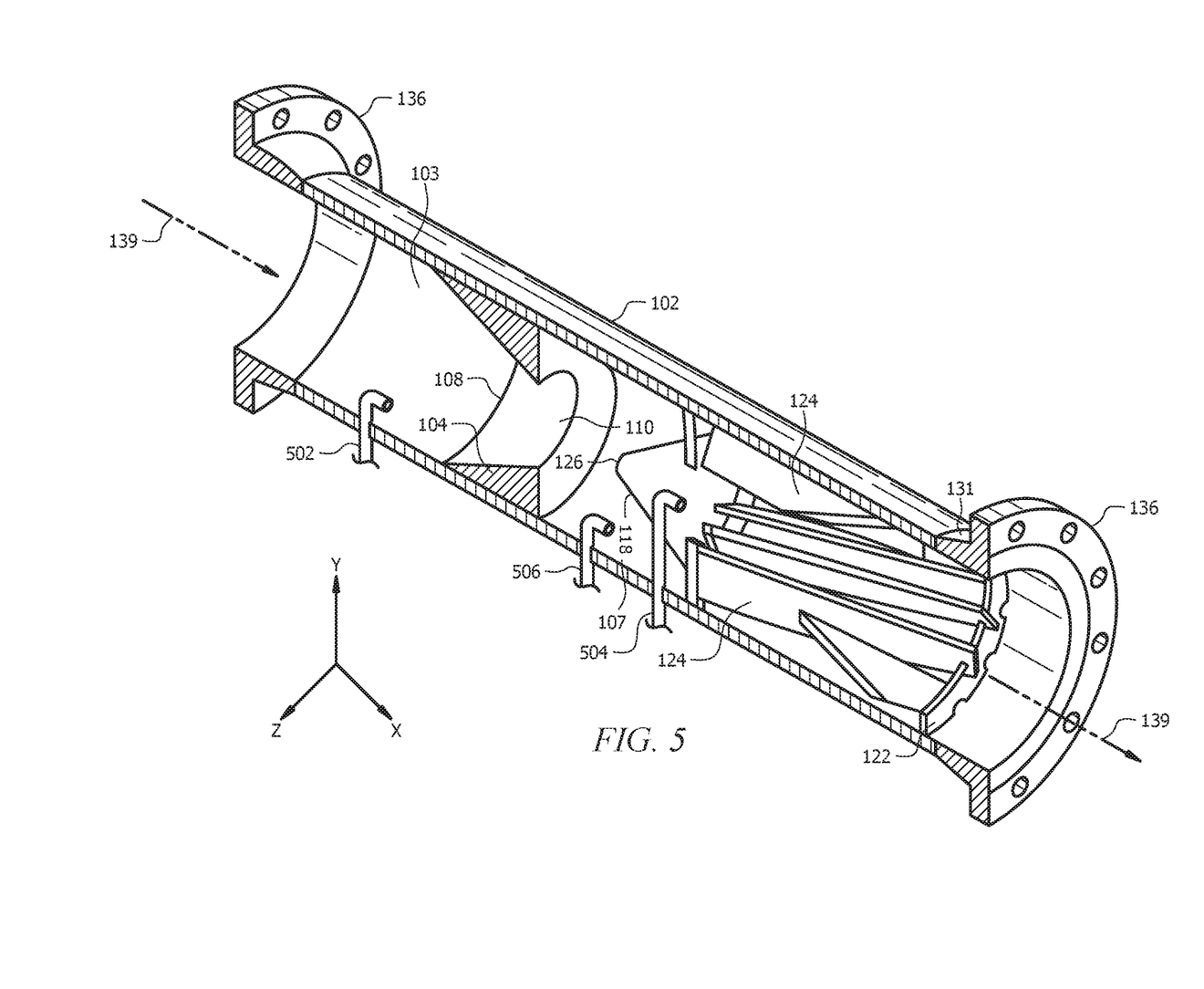
FIG. 5 illustrates a cross sectional view of the static mixer of FIG. 4, in accordance with embodiments of the disclosure.

FIG. 5 further illustrates optional mixing injection points within the mixer 100. In some embodiments, various fluids such as specific chemicals or mixtures of chemicals can be injected directly into the mixer at one or more points. As shown in FIG. 5, the injection points can include the use of one or more tubes or nozzles located upstream, downstream, or within the mixer 100. In an embodiment, one or more injection points 502, 504, or 506 can be used to inject fluids into the stream passing through the mixer. The injection points 502, 504, 506 can comprise a tube passing through the housing 102 and providing one or more terminal points at which a fluid can be injected into the fluid stream. As shown an injection point 502 can be disposed upstream of the reduction cone 104, an injection point 506 can be disposed within the mixing chamber 107, and/or a mixing point 504 can be disposed downstream of the expansion cone 118. When the optional fluid injection point 504 is present downstream of the expansion cone 118, the injection point 504 can inject fluid within the downstream side of the expansion cone 118 and/or at one or more points within the volume enclosed by the blades 124. While shown as a single tube, each injection point can comprise one or more inlet tubes to provide a desired volume of injected fluid. In addition, each injection point 502, 504, 506 can comprise one or more opening to release the injected fluid at a point or over an area or line along the flowpath.

Various fluids can be injected at the one or more injection points 502, 504, 506. For example, fresh water, demulsifiers, surfactants, treatment chemicals, or other such fluids can be injected at the injection points. The injection points 502, 504, 506 may then allow for precise treatment of the fluid flowing through the mixer at various stages of mixing. For example, a demulsifier may be injected downstream of the expansion cone 118 in order to first allow a two phase fluid to mix and contact upstream of the expansion cone 118 while then providing the demulsifier once the two phase fluid has mixed to prevent an emulsion from forming in the mixing section as well as downstream of the mixer 100. In some embodiments, the one or more injection points 502, 504, 506 or an upstream or downstream injection point can be used to inject water (e.g., fresh water, an aqueous mixture, etc.). The ability to inject water may allow the ratio of each phase in a multiphase fluid to be controlled as well as providing an aqueous fluid having the desired properties at particular point along the flowpath.

Figure 6:
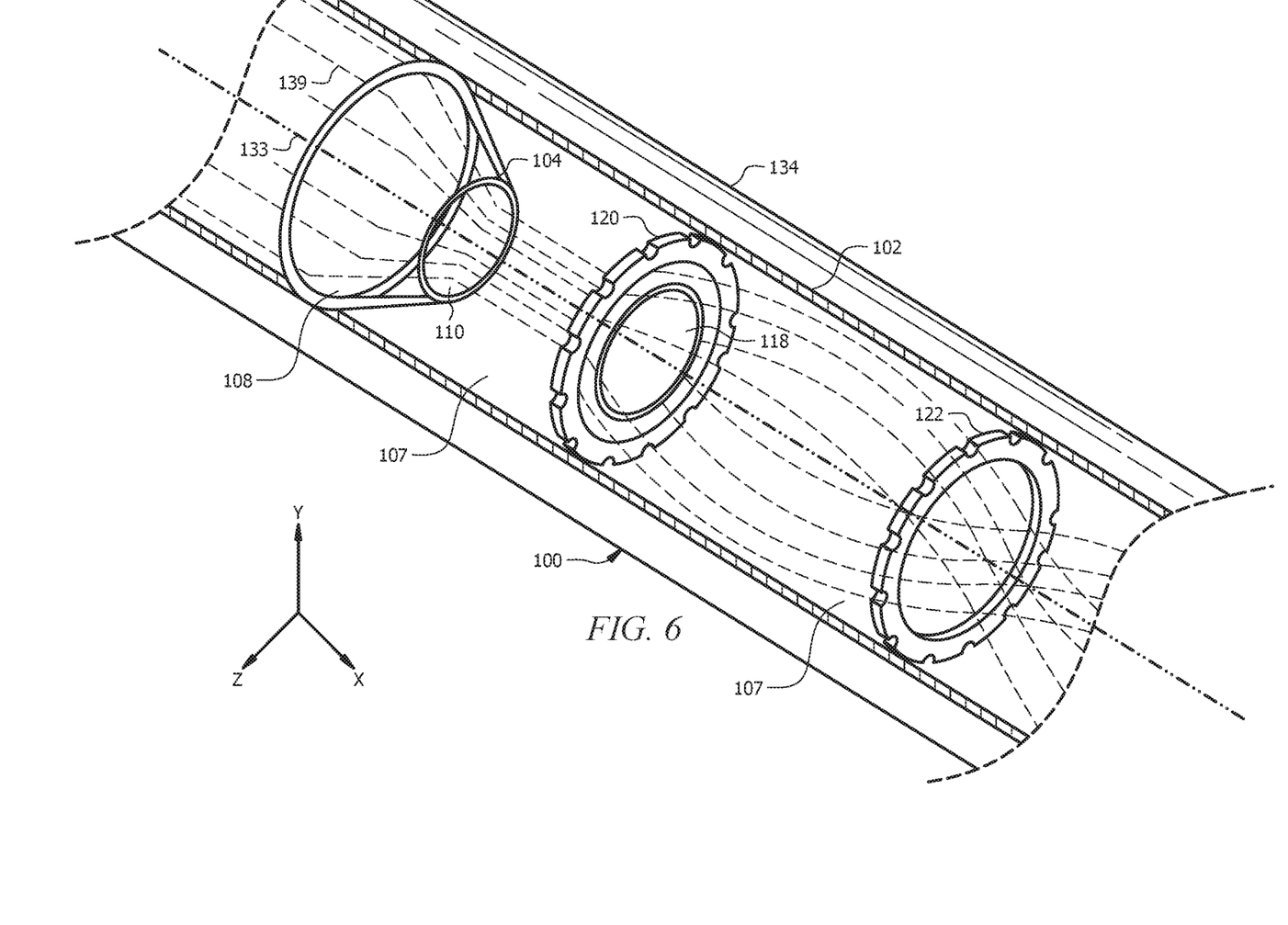
FIG. 6 illustrates a fluid flow path for a static mixer in accordance with embodiments of the disclosure.

FIGS. 5 and 6 illustrate a travel path of a multiphase fluid 139 (e.g., a multiphase mixture of oil, salt, and water, wherein salt may be distributed in the oil and the water), as the fluid 139 travels through the static mixer 100. The fluid 139 may flow into the housing 102 and through the flow-in opening 108, enter the mixing chamber 107, contact the apex 126 and flow along the exterior surface 125 of the expansion cone 118 through the first ring 120 and through and along the blades 124, and exit through the second ring 122. This travel path may allow for efficient mixing of the fluid 139, thereby drawing out salt from the oil and transferring the salt into the water.

With reference to FIGS. 1-6, operation of the static mixer 100 may be described as follows. Water or an aqueous fluid may be introduced into an oil containing stream upstream of the static mixer 100, thereby allowing a two phase liquid-liquid mixture (e.g., the fluid 139) to enter the static mixer 100 via the flow-in opening 108. The fluid 139 may first enter the reduction cone 104 that may cause a velocity of the fluid 139 to increase. As noted above, the reduction cone 104 may be configured to increase a velocity of the fluid 139 passing through it. The fluid may then enter the mixing chamber 107 and contact the apex 126 and the exterior surface 125 of the expansion cone 118 to maintain the increased velocity, while forcing the fluid 139 to flow outwards along the exterior surface 125 of the expansion cone 118, and through and along the blades 124 and through the second ring 122, thereafter exiting housing 102. The combination of the reduction cone 104 and the expansion cone 118 may provide a first portion of the mixing and contact between the two phases, thereby drawing out a portion of salt from the oil and transferring the salt into the water.

As noted above, the blades 124 may be positioned at offset angles with respect to the longitudinal axis 133 of the housing 102. The offset angles of the blades 124 may cause the fluid 139 to rotate and provide further contact and mixing between the two phases due to centrifugal forces. The blades 124 may provide a second portion of the mixing and contact between the two phases, thereby drawing out a portion of salt from the oil and transferring the salt into the water. The resulting contact may not be sufficient to over-mix the two phases (which may make further separation difficult), but may provide improved contact and mixing between the two phases over other static mixer designs.

In some embodiments, only a portion of the mixer 100 may be present while still achieving contact between the fluids. For example, a mixer 100 may comprise only the reduction cone 104 and the expansion cone 118, which may be sufficient to provide contact between the phases of the multi-phase fluid 139. In some embodiments, only the expansion cone 118 and the blades 124 may be present and may provide sufficient mixing to provide contact between the phases of the multi-phase fluid 139.

The mixer 100 as described herein can be used in a number of environments. In general, the mixer 100 can be used to provide mixing and contacting between multiple phases in a multiphase fluid 139. Exemplary uses include contacting oil and water phases in a desalting apparatus, contacting immiscible phases in a pipe or pipeline. In general, the mixer can be used in a variety of locations, and in some embodiments, the mixer 100 can be used as a standalone device or within a pipeline in a subsea pipeline or assembly, on a platform, or as part of an onshore facility. In some embodiments, the mixer 100 can be used in a hydrocarbon production and/or treatment facility.

While described herein in the context of contacting a multi-phase fluid 139 comprising an aqueous phase and an oil phase, the mixer 100 may also be useful in contacting other multi-phase fluid streams to allow for contact between the two phases without creating an emulsion. Suitable examples can include an aqueous phase in contact with an organic phase, two immiscible organic phases, or other multiphase fluids comprising one or more liquid phases such as a molten salt phase, a supercritical fluid phase, and the like. Thus, the present disclosure is not limited to use of the mixer with a desalter.

Having described various devices, systems, and methods, some embodiments can include, but are not limited to:

In a first embodiment, a static mixer for desalting a fluid can include a housing; a reduction cone disposed concentrically within the housing; and an expansion cone disposed concentrically within the housing adjacent to the reduction cone; wherein the static mixer is configured to direct fluid flow through the reduction cone onto the expansion cone, thereby mixing the fluid.

A second embodiment can include the static mixer of the first embodiment, further comprising a plurality of blades disposed within the housing between a first ring and a second ring, wherein the plurality of blades extends from the first ring to the second ring along a longitudinal axis of the housing.

A third embodiment can include the static mixer of the first or second embodiment, wherein the first ring comprises first ring slots, and the second ring comprises second ring slots, wherein the first ring slots are offset from the second ring slots.

A fourth embodiment can include the static mixer of any of the first through third embodiments, wherein a proximal end of each blade is positioned into a first ring slot and a distal end of each blade is positioned into a second ring slot.

A fifth embodiment can include the static mixer of any of the first through fourth embodiments, wherein each first ring slot and each second ring slot, due to an offset, is configured to incline each blade with respect to a longitudinal axis passing through a center of the reduction cone and expansion cone as each blade extends from the first ring to the second ring.

A sixth embodiment can include the static mixer of any of the first through fifth embodiments, wherein the static mixer is also configured to direct flow through the plurality of blades, thereby mixing the fluid.

A seventh embodiment can include the static mixer of any of the first through sixth embodiments, wherein the reduction cone further comprises a grommet positioned at a circumference of the flow-out opening, wherein the grommet is configured to prevent backflow along an exterior surface of the reduction cone.

An eighth embodiment can include the static mixer of any of the first to seventh embodiments, further comprising: one or more fluid injection points, wherein the one or more fluid injection points are configured to provide a fluid pathway from outside of the static mixer to within the housing In a ninth embodiment, a static mixer for desalting a fluid can include a housing; a reduction cone disposed concentrically within the housing; an expansion cone disposed concentrically within the housing; and a plurality of blades disposed within the housing; wherein the static mixer is configured to increase a velocity of a fluid with the reduction cone, distribute the fluid with the expansion cone, and rotate the fluid with the plurality of blades, thereby mixing the fluid.

A tenth embodiment can include the static mixer of the ninth embodiment, wherein the reduction cone comprises a flow-in opening and a flow-out opening.

A eleventh embodiment can include the static mixer of the ninth or tenth embodiment, wherein the expansion cone is positioned downstream from the reduction cone.

An twelfth embodiment can include the static mixer of any of the ninth through eleventh embodiments, wherein the plurality of blades are positioned downstream from the expansion cone.

A thirteenth embodiment can include the static mixer of any of the ninth through twelfth embodiments, wherein the plurality of blades comprises straight flat blades of a rectangular shape.

A fourteenth embodiment can include the static mixer of any of the ninth through thirteenth embodiments, wherein each blade is inclined with respect to a longitudinal axis passing through a center of the reduction cone and the expansion cone.

A fifteenth embodiment can include the static mixer of any of the ninth to fourteenth embodiments, further comprising: one or more fluid injection points, wherein the one or more fluid injection points are configured to provide a fluid pathway from outside of the static mixer to within the housing.

A sixteenth embodiment can include the static mixer of the fifteenth embodiment, wherein at least one fluid injection point of the one or more fluid injection points is disposed within at least one of the expansion cone or the plurality of blades.

In a seventeenth embodiment, a static mixer comprises: a housing; an expansion cone disposed concentrically within the housing; and a plurality of blades disposed within the housing; wherein the static mixer is configured to direct fluid flow onto expansion cone and through the plurality of blades.

An eighteenth embodiment can include the static mixer of the seventeenth embodiment, further comprising the fluid disposed within the housing, wherein the fluid comprises a multiphase fluid comprising oil, water, and salt, wherein the salt is distributed in the oil and the water.

A nineteenth embodiment can include the static mixer of the seventeenth or eighteenth embodiment, wherein the plurality of blades are configured to rotate the fluid when the fluid is flowing through the mixer.

A twentieth embodiment can include the static mixer of any of the seventeenth to nineteenth embodiments, wherein the plurality of blades are positioned downstream from the expansion cone.

A twenty first embodiment can include the static mixer of any of the seventeenth to twentieth embodiments, wherein the static mixer is positioned within a pipe.

A twenty second embodiment can include the static mixer of the twenty first embodiment, wherein the pipe is positioned on a production platform.

A twenty third embodiment can include the static mixer of any of the seventeenth to twenty second embodiments, wherein the expansion cone is coupled to the plurality of blades.

In a twenty fourth embodiment, a method for static mixing a fluid comprises: passing the fluid through a reduction cone; increasing a velocity of the fluid as the fluid flow through the reduction cone; directing the fluid onto an expansion cone downstream of the reduction cone; maintaining an increased velocity with the expansion cone; distributing the fluid over the expansion cone; and mixing the fluid.

A twenty fifth embodiment can include the method of the twenty fourth embodiment, wherein the fluid comprises a multiphase fluid comprising salt, water, and oil, wherein the salt is distributed in the oil and the water.

A twenty sixth embodiment can include the method of the twenty fourth or twenty fifth embodiment, further comprising drawing out the salt from the oil due to the mixing of the fluid with the reduction cone and the expansion cone.

A twenty seventh embodiment can include the method of any of the twenty fourth to twenty sixth embodiments, further comprising transferring the salt into the water due to the mixing of the fluid with the reduction cone and the expansion cone.

A twenty eighth embodiment can include the method of any of the twenty fourth to twenty sixth embodiments, further comprising: passing the fluid through a plurality of blades; and rotating the fluid in response to passing the fluid through the plurality of blades.

A twenty ninth embodiment can include the method of the twenty eighth embodiment, wherein each blade of the plurality of blades is straight.

In a thirtieth embodiment, a method for static mixing of a fluid comprises: passing the fluid through a reduction cone; increasing a velocity of the fluid with the reduction cone; directing the fluid onto an expansion cone; maintaining an increased velocity with the expansion cone; distributing the fluid over the expansion cone; allowing the fluid to flow through a plurality of blades, wherein each blade is straight; rotating the fluid with the plurality of blades; and mixing the fluid.

A thirty first embodiment can include the method of the thirtieth embodiment, wherein the fluid comprises water, salt, and oil, wherein the salt is distributed in the oil and the water.

A thirty second embodiment can include the method of the thirty first embodiment, further comprising: drawing out the salt from the oil due to the mixing of the fluid with the reduction cone and the expansion cone.

A thirty third embodiment can include the method of the thirty first or thirty second embodiment, further comprising: transferring the salt into the water due to the mixing of the fluid with the reduction cone and the expansion cone.

A thirty fourth embodiment can include the method of any of the thirty first to thirty third embodiments, further comprising: drawing out the salt from the oil due to the mixing of the fluid with the plurality of blades.

A thirty fifth embodiment can include the method of any of the thirty first to thirty fourth embodiments, further comprising: transferring the salt into the water due to the mixing of the fluid with the plurality of blades.

A thirty sixth embodiment can include the method of any of the thirtieth to thirty fifth embodiments, further comprising: injecting a fluid composition into the fluid at a point between a first position upstream of the reduction cone and a second point downstream of the plurality of blades.

A thirty seventh embodiment can include the method of the thirty sixth embodiment, wherein the fluid composition comprises a demulsifier.

A thirty eighth embodiment can include the method of the thirty seventh embodiment, wherein the demulsifier is injected within or downstream of the expansion cone.

A thirty ninth embodiment can include the method of any of the thirtieth to thirty eight embodiments, further comprising: passing the fluid through a subsea pipe, wherein the reduction cone, the expansion cone, and the plurality of blades are disposed within the subsea pipe, and wherein the mixing of the fluid occurs within the subsea pipe.

In a fortieth embodiment, a method for static mixing of a fluid comprises: passing a fluid through an interior of a housing; directing the fluid onto an expansion cone between an exterior surface of the expansion cone and the interior of the housing; distributing the fluid over the expansion cone; allowing the fluid to flow through a plurality of blades, wherein each blade is straight; and rotating the fluid within the housing with the plurality of blades.

A forty first embodiment can include the method of the fortieth embodiment, wherein the fluid comprises water, salt, and oil, wherein the salt is distributed in the oil and the water.

A forty second embodiment can include the method of the forty first embodiment, further comprising drawing out the salt from the oil due to the mixing of the fluid with the plurality of blades.

A forty third embodiment can include the method of the forty first or forty second embodiment, further comprising transferring the salt into the water due to the mixing of the fluid with the plurality of blades.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented. The particular naming of the components, capitalization of terms, the attributes, structures, or any other structural aspect is not mandatory or significant, and the mechanisms that implement the disclosure or its features may have different names, formats, or protocols. Also, the particular division of functionality between the various components described herein is merely exemplary, and not mandatory; functions performed by a single system component may instead be performed by multiple components, and functions performed by multiple components instead may be performed by a single component. Finally, it should be noted that the language used in the specification has been principally selected for readability and instructional purposes, and may not have been selected to delineate or circumscribe the subject matter.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, Ru, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. The word "exemplary" is used herein to mean "serving as an example, instance, or illustration." Any implementation described herein as "exemplary" is not necessarily to be construed as preferred or advantageous over other implementations. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method for static mixing a multiphase fluid, the method comprising:
   passing a fluid through a reduction cone, wherein the fluid comprises a multiphase fluid;
   increasing a velocity of the fluid as the fluid flows through the reduction cone, wherein the fluid has an increased velocity after increasing the velocity of the fluid;
   directing the fluid onto an expansion cone downstream of the reduction cone;
   maintaining the increased velocity with the expansion cone;
   distributing the fluid over the expansion cone; and
   mixing the fluid.

2. The method of claim 1, further comprising:
   allowing the fluid to flow through a plurality of blades downstream of the expansion cone, wherein each blade is straight; and
   rotating the fluid with the plurality of blades.

3. The method of claim 1, wherein the fluid comprises a multiphase fluid comprising salt, water, and oil, wherein the salt is distributed in the oil and the water, wherein the method further comprises:
   drawing out the salt from the oil due to the mixing of the fluid.

4. The method of claim 3, further comprising:
   transferring the salt into the water due to the mixing of the fluid with the reduction cone and the expansion cone.

5. The method of claim 1, wherein a plurality of blades are disposed downstream of the expansion cone, and wherein the method further comprises:
   injecting a fluid composition into the fluid at a point between a first position upstream of the reduction cone and a second point downstream of the plurality of blades.

6. The method of claim 5, wherein the fluid composition comprises a demulsifier, and wherein the demulsifier is injected within or downstream of the expansion cone.

7. The method of claim 2, further comprising:
   passing the fluid through a subsea pipe, wherein the reduction cone, the expansion cone, and the plurality of blades are disposed within the subsea pipe, and wherein the mixing of the fluid occurs within the subsea pipe.

8. The method of claim 1, wherein the mixing of the fluid occurs within a static mixer, and wherein the static mixer comprises:
   a housing;
   the reduction cone disposed concentrically within the housing; and
   the expansion cone disposed concentrically within the housing adjacent to the reduction cone.

9. The method of claim 8, wherein the static mixer further comprises:
   a plurality of blades disposed within the housing between a first ring and a second ring, wherein the plurality of blades extends from the first ring to the second ring at a non-parallel angle with respect to a longitudinal axis of the housing.

10. The method of claim 9, wherein the first ring comprises first ring slots, and the second ring comprises second ring slots, wherein the first ring slots are offset from the second ring slots, and wherein each blade of the plurality of blades is inclined with respect to a longitudinal axis passing through a center of the reduction cone and the expansion cone.

11. The method of claim 10, wherein a proximal end of each blade of the plurality of blades is positioned into a first ring slot of the first ring slots and a distal end of each blade is positioned into a second ring slot of the second ring slots.

12. The method of claim 9, wherein the reduction cone comprises a flow-in opening and a flow-out opening, wherein a diameter of the flow-in opening is larger than a diameter of the flow-out opening.

13. The method of claim 12, wherein the reduction cone comprises a grommet positioned at a circumference of the flow-out opening, wherein the grommet is configured to prevent backflow along an exterior surface of the reduction cone.

14. The method of claim 8, wherein the static mixer further comprises:
   one or more fluid injection points, wherein the one or more fluid injection points are configured to provide a fluid pathway from outside of the static mixer to within the housing.

15. The method of claim 1, wherein the mixing of the fluid occurs within a static mixer, and wherein the static mixer comprises:
   a housing;
   the reduction cone disposed concentrically within the housing;
   the expansion cone disposed concentrically within the housing; and
   a plurality of blades disposed within the housing, wherein the expansion cone is disposed between the reduction cone and the plurality of blades in the housing;
   wherein the expansion cone is configured to distribute the fluid, and wherein the plurality of blades are configured to rotate the fluid.

16. The method of claim 15, wherein the expansion cone is positioned downstream from the reduction cone.

17. The method of claim 16, wherein the plurality of blades are positioned downstream from the expansion cone.

18. The method of claim 17, wherein the plurality of blades comprises straight flat blades of a rectangular shape, and wherein each blade is inclined with respect to a longitudinal axis passing through a center of the reduction cone and the expansion cone.

19. The method of claim 15, further comprising:
   one or more fluid injection points, wherein the one or more fluid injection points are configured to provide a fluid pathway from outside of the static mixer to within the housing.

20. The method of claim 19, wherein at least one fluid injection point of the one or more fluid injection points is disposed within at least one of the expansion cone or the plurality of blades.

* * * * *